A. R. LOCKE
Sept. 13, 1932. SELECTIVE CIRCUIT SYSTEM AND REMOTE CONTROL Re. 18,593
Original Filed Sept. 1, 1920 5 Sheets-Sheet 1
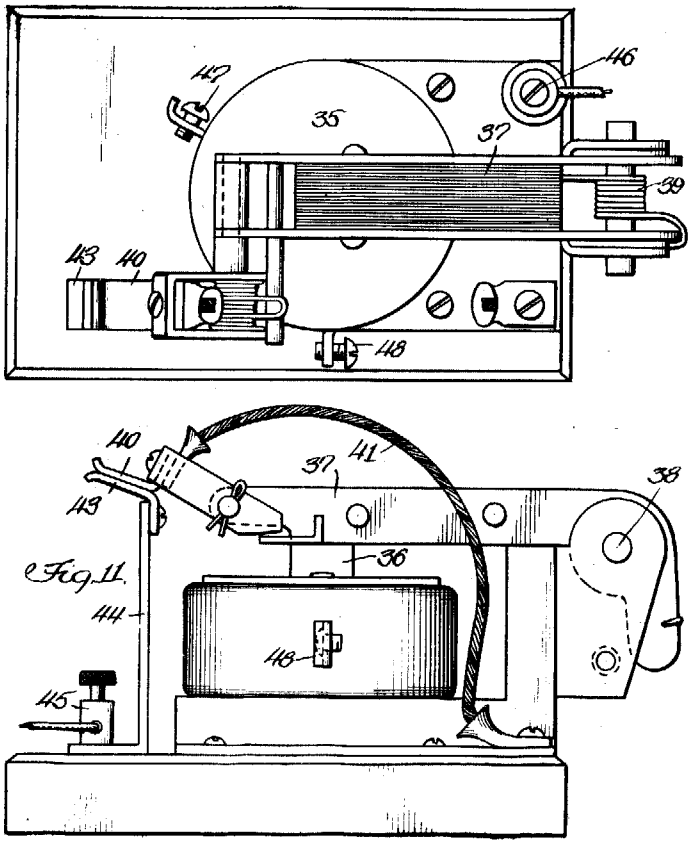
Fig. 10.
Fig. 11.
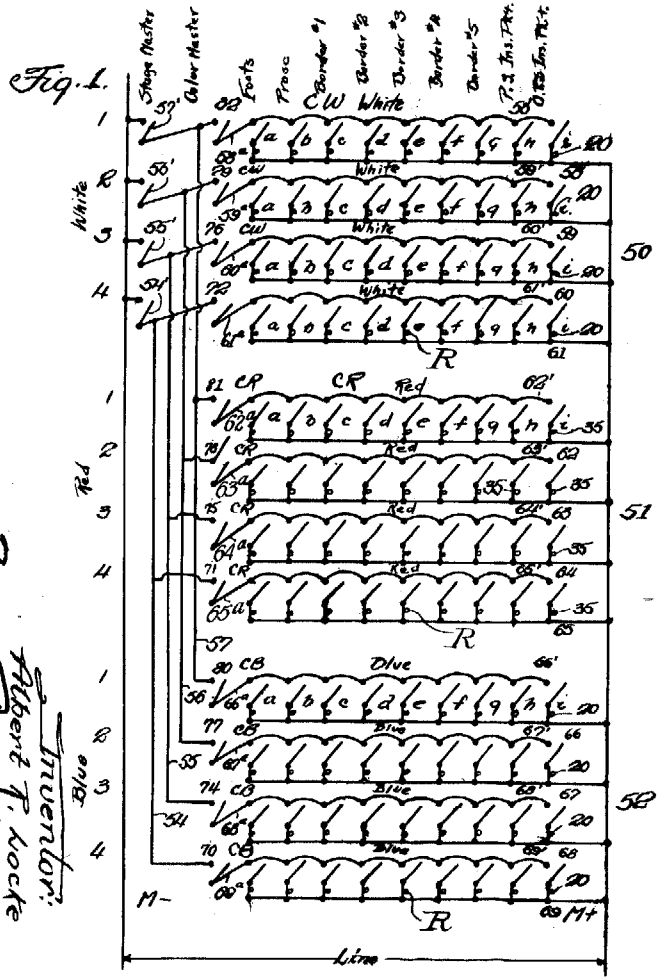
Fig. 7.
Inventor:
Albert R. Locke
By Fonée Bain & Hinkle
Attys.

A. R. LOCKE

Sept. 13, 1932. SELECTIVE CIRCUIT SYSTEM AND REMOTE CONTROL Re. 18,593

Original Filed Sept. 1, 1920 5 Sheets-Sheet 2

Inventor:
Albert R. Locke
By Fowle Bain Hinkle
Attys

A. R. LOCKE

Sept. 13, 1932. SELECTIVE CIRCUIT SYSTEM AND REMOTE CONTROL Re. 18,593

Original Filed Sept. 1, 1920 5 Sheets-Sheet 3

Inventor:
Albert R. Locke
By Jone'e Bain Hinkle
Attys

A. R. LOCKE

Sept. 13, 1932. SELECTIVE CIRCUIT SYSTEM AND REMOTE CONTROL Re. 18,593

Original Filed Sept. 1, 1920 5 Sheets-Sheet 4

Inventor:
Albert R. Locke
Forrest Bain Hankle
Attys.

A. R. LOCKE

Sept. 13, 1932. SELECTIVE CIRCUIT SYSTEM AND REMOTE CONTROL Re. 18,593

Original Filed Sept. 1, 1920 5 Sheets-Sheet 5

Inventor:
Albert R. Locke
By Jonée Bain Hinkle
Attys.

Reissued Sept. 13, 1932

Re. 18,593

UNITED STATES PATENT OFFICE

ALBERT R. LOCKE, OF OAK PARK, ILLINOIS

SELECTIVE CIRCUIT SYSTEM AND REMOTE CONTROL

Original No. 1,638,774, dated August 9, 1927, Serial No. 407,386, filed September 1, 1920. Application for reissue filed June 25, 1928. Serial No. 288,214.

This invention relates to a selective circuit system and remote control of visual scenic effects, and is especially desirable for illuminating the stage and other parts of the interior of a theatre, in accordance with the production or play being presented therein, although the invention has many and varied uses as will be apparent to one skilled in the art.

An object of the invention is to provide a system by which a plurality of combinations of lights, or groups of lights for a scene, may be "set-up" in independent circuits, to be subsequently energized and which are non-interfering under any condition of operation and which may be selectively energized in any desired order.

Another object of the invention is the provision of a system in which a plurality of lighting circuits are selectively controlled by a plurality of individual switches which are so distributed in independent circuits that these switches may be pre-set in closed position and subsequently energized in any desired order by means of separately operable switches each of which controls a plurality of said individual switches.

Another object is to provide a system, as described in which the position of the switches, of a group of switches may be used to visually indicate the character of "set-up" instead of employing pilot lamps for the purpose.

A further object is to control each group of closed switches, by which the set-ups are made to control the circuits formed by a selective number thereof, in the specific groups, by use of a master switch and color or sub-master switch.

A still further object is to provide a system in which a full complement of scenes for an entire show, or play, may be set-up at any time prior to the beginning of the show, and switched in and out in any order in which they may be required, and which set-ups may remain on the pilot board and used, as occasions arise, without change, for any desired period of time. The set-ups being made ready before they are required, no time is lost in shifting from one scene of illumination to another, at the time when variations in effects are needed.

Heretofore, remotely controlled systems of distribution of this character, commonly in use are confined to necessity of disconnecting one set-up, or order of circuits, before another set-up, or order of circuits, can be made. The present invention permits the possibility of setting up a number of circuits by the use of a series of independent sub-switches, each group of switches producing a different lighting effect, and each group producing an independently controlled scene, with a convenient means for shifting from one group to the other, in any order, by means of a color or sub-master switch for each group and a master switch for each alike sub-group of each major group. In the accompanying illustration, as many as twelve set-ups can be made in advance before the beginning of a show. In this instance a three color and four set-up board is schematically illustrated. It is to be clearly understood, however, that the present invention may be constructed in such a manner that any desired number of set-ups may be made in advance, and the switch boards may be constructed to accommodate any desired number of individual colors or combinations of colors or individual or combination set-ups.

In order that my system of remote control and electrical distribution may clearly be understood I have illustrated herein and will briefly describe several well known types of switches and relays but the invention herein is not specifically concerned with the particular details of their construction. They are merely shown as means to an end, for the purpose of rendering the following description more readily understood.

In the drawings:

Figure 1 shows a schematic arrangement of circuits and the controlling pilot switches arranged in groups and sub-groups, and while the contactor switches are shown adjacent the pilot switches, for clearness of disclosure, they are in practice preferably located on a board remote from the pilot switches, as more clearly shown in Figure 1[a].

Figure 1[a] shows the arrangement of circuits, shown generally in Figure 1, and in which two groups of switches and lamps are connected and in which two coil contactors are diagrammatically shown.

Figure 2 shows a fragmentary schematic arrangement of circuits of the pilot board and also an arrangement of circuits and the instruments of a switch board, which in a physical embodiment is located at a point remote from the pilot board, in which two circuits of the pilot board control directly one contactor of a series of contactors, or automatic light switches, for opening and closing a circuit containing electric lights.

Figure 10 is a plan view of a conventional relay, and,

Figure 11 is a side elevation of the relay.

In all the views the name reference characters are employed to indicate similar parts.

It may be well to first describe in general terms a contactor or circuit closing switch, and the relays illustrated before taking up a description of the circuits in which these instruments as an agency may be employed for carrying the invention into effect.

Figure 5:
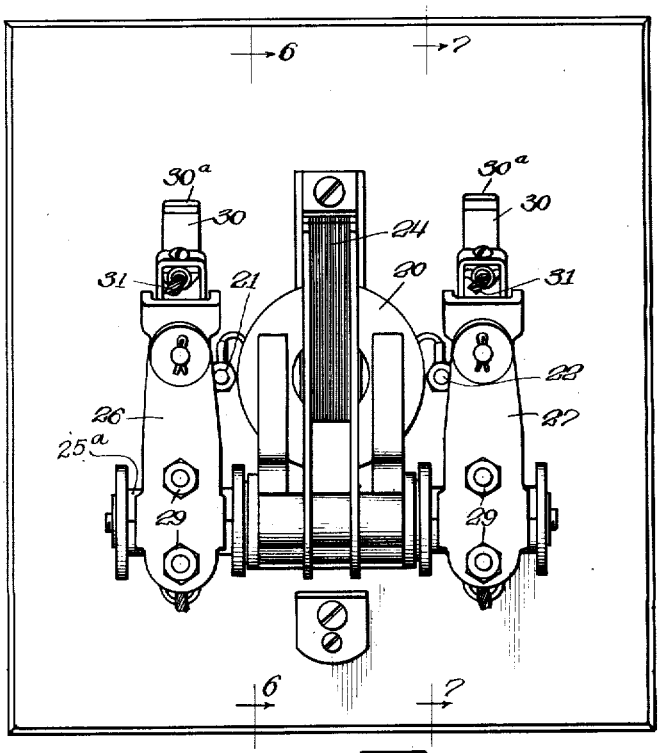
Figure 5 shows a plan view of a light switch or a contactor having one coil for controlling both legs of a light circuit.
Figure 7:
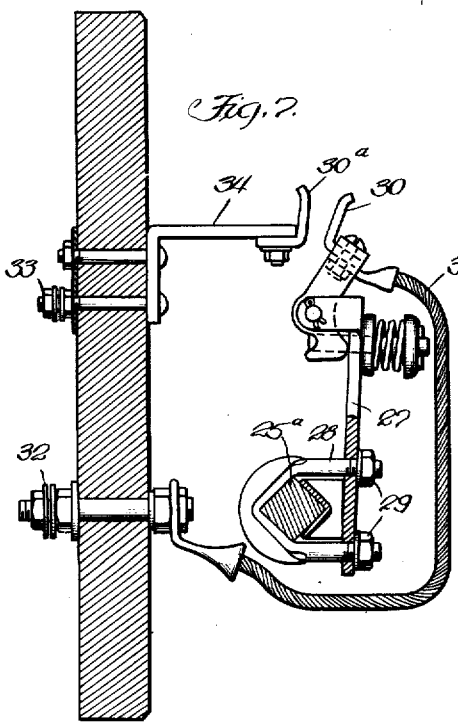
Figure 7 is a section taken on line 7—7 of Figure 5.
Figure 6:
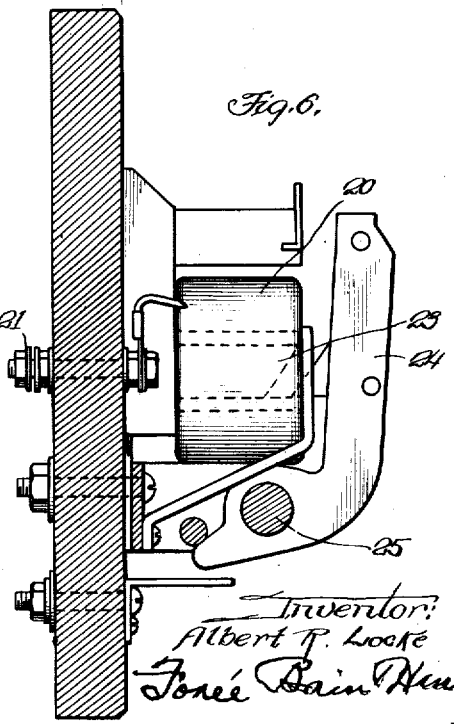
Figure 6 is a section taken on line 6—6 of Figure 5.
Figure 8:
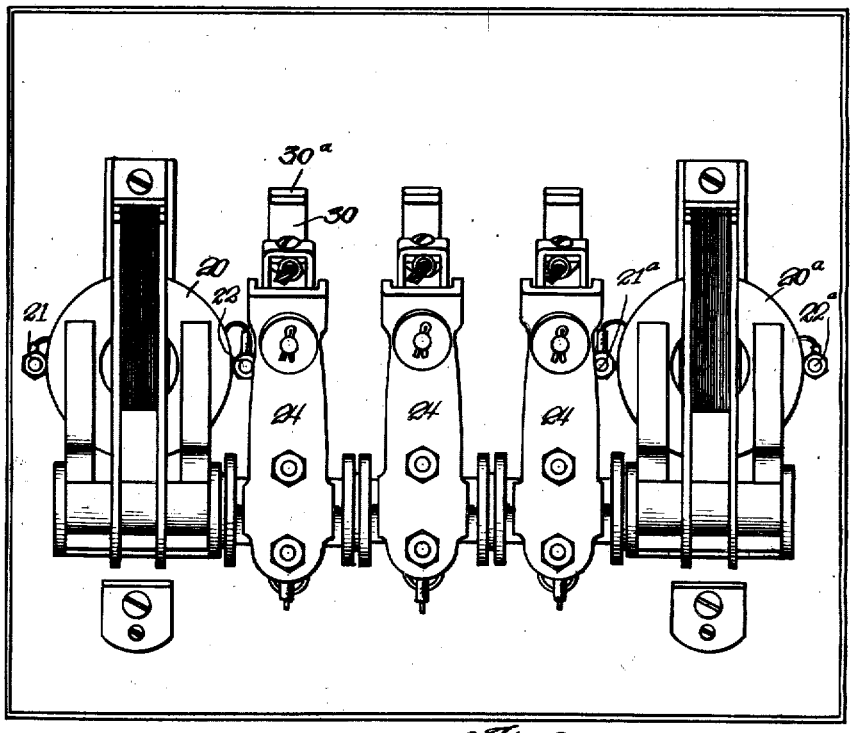
Figure 8 shows a contactor having two coils, either of which, when energized, will operate the contactor for closing three legs of the lighting circuit.

In Figures 5 and 6 a central coil 20 is provided with terminals 21 and 22 to which relatively small wires from the pilot board may be connected, for the purpose of energizing the coil. The coil is provided with a relatively stationary core 23, and a movable circuit closing armature 24, which is pivoted, as at 25 to a shaft, which extends on either side of the pivotal point, as at $25^a$, Figure 7. The contacting arms, 26 and 27, are connected to the shaft $25^a$ by means of yoke pieces 28, held in place by the nuts 29. Each of the arms carries a contact member 30, connected by a flexible cable 31 to a terminal 32 of the device. When the coil 23 is energized and the armature 24 attracted the contacts 30 and $30^a$ are closed and, therefore, circuit will be completed from the terminal 32 thru the cable 31, contacts 30 and $30^a$, and through the standards 34 to the binding post 33, or the other terminal of the contactor or switch, and lamps connected thereto are lighted. The contactor, shown in Figure 8, is provided with two coils 20 and $20^a$. When either of these coils is energized the arms 24, of which there are three, close their respective circuits as described, which may be three legs of a three wire system.

Figure 9:
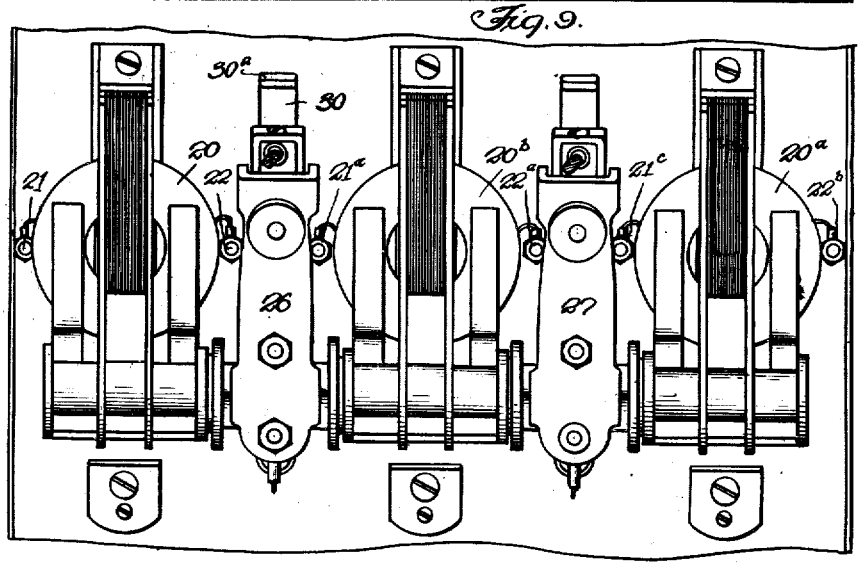
Figure 9 shows a similar contactor with three coils, any one of which coils will operate the switch for closing two legs of a circuit.

Figure 9 shows a similar contactor, or switch, having three coils 20, $20^a$, and $20^b$. Any one of these coils when properly energized, will cause the arms 26 and 27 to move downwardly and complete their respective circuits as heretofore described.

Figures 10 and 11 are plan and elevational views, respectively, of a relay, which may be employed intermediate the switches of the pilot board and the contactors which they control.

The relay shown in Figures 10 and 11 is provided with a magnet coil 35 which is directly connected to wires leading from the pilot switches, as by the terminals 47 and 48. When a pilot switch is closed through a suitable source of current supply, the relay coil 35 will be energized and the armature 37 thereof will be attracted to the core 36, thereby completing the circuit between the contact members 40 and 43. The latter member is mounted upon a standard 44 which is connected to the terminal 45 of the relay. The binding posts 45 and 46 are connected in such manner as to control the circuit through the coil 20 of the contactor, or light controlling switch. The armature 37 of the relay is pivoted as at 39 and is provided with a retractile spring 39, which moves the armature when the coil 35 is deenergized.

Figure 1A:
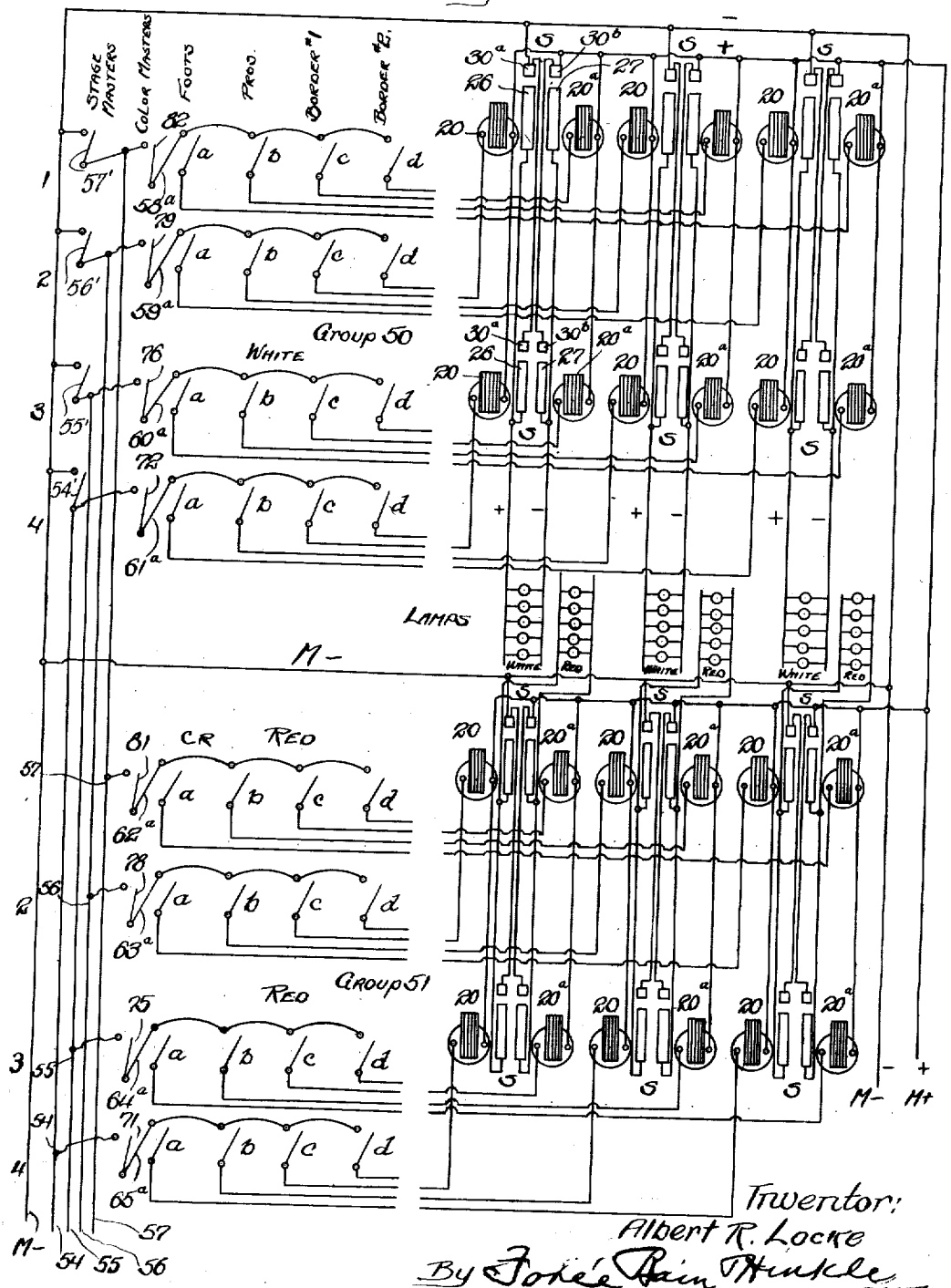
Figure 2:
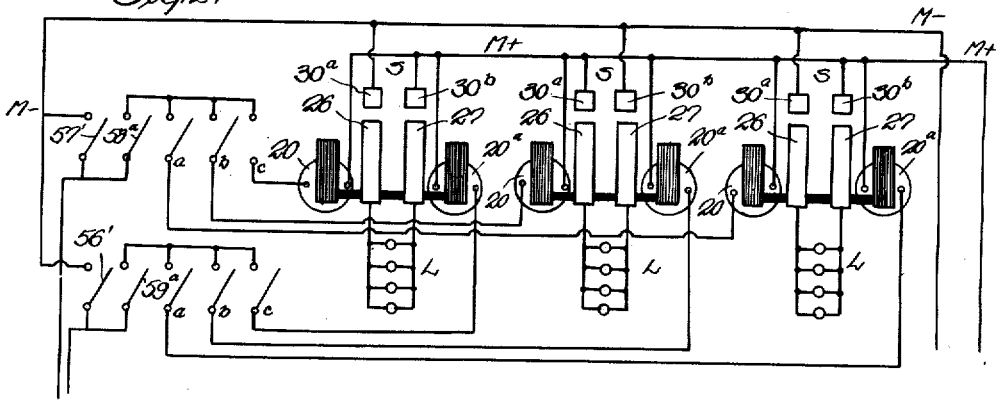

In the diagram Figure 1, showing the pilot board, there are three major groups of switches for as many different colored lights, groups 50, 51, and 52, for controlling the white lights, the red lights, and the blue lights, respectively. These groups may be extended to include a larger number of major groups for controlling lights of other colors, or lights or devices of other description or character.

Each of the major groups contains a plurality of subgroups which I have numbered 1, 2, 3, and 4, respectively. There may be more or less. Each of the switches of the subgroups I have indicated by the reference characters *a* to *i*, inclusive. The current supply mains, I have indicated by the reference characters M+ and M−, respectively. Between the main M+ and the series of major groups of switches there extends vertically a series of master switch mains, which I have indicated by the reference characters 54, 55, 56, and 57, there being one of these mains for as many sub-groups 1, 2, 3, 4, as are contained in one of the major groups 50, 51, 52. Like sub-group switches 58ᵃ to 59ᵃ of each major group are connected to a given master switch main 54 to 57. The first vertical line of switches *a* of all the groups, which may be termed a vertical group of switches *a* if so desired, controls the white, red, and blue foot lights; the second vertical line or group of switches *b* in the major groups control the same character of lights in the proscenium; the third vertical line of switches of the respective sub-groups, in fourth *d* the border lights number 2, the fifth *e* border lights number 3, and so on.

I have indicated the lamp lighting switches or contactors by the reference character S and the relays, which, in some instances, may be used as intermediaries for controlling the contacting switches, by the reference character R. In Figure 1, there is shown branch wires or lighting-circuit-control conductors 58 to 69, inclusive, from the main M+ connected through the respective relays R to the switches of the respective sub-groups, in parallel.

Figure 3:
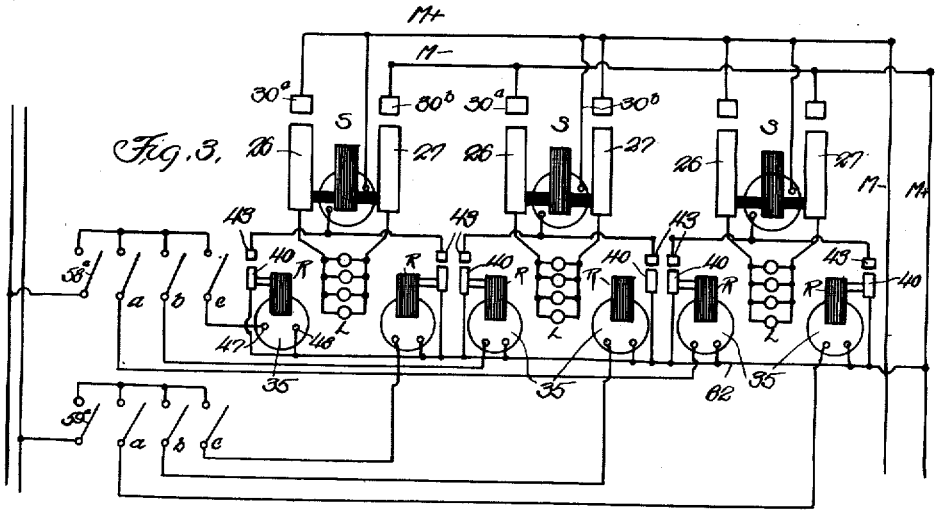
Figure 3 shows a contactor common to two or more circuits of the pilot board with intervening relays, there being one relay for each circuit.
Figure 4:
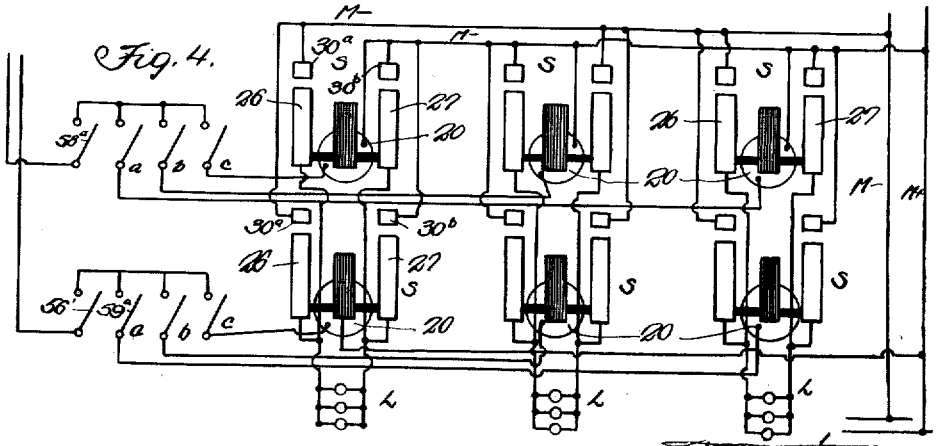
Figure 4 is a modification of Figure 2, showing a contactor or switch individual to each circuit of the pilot board in which two switches control the same set of lights.

In Figure 3, the relays R are shown located near the contactors or switches S, though they may be located as shown, on or nearer the pilot board, or in any desirable location. In Figure 3, one terminal 48 of the relay is shown connected direct to the branch wire 62, which is a branch of the main M+, as shown in the second major group 51 in Figure 1. The other terminal of each of the relays is connected to one terminal of one of the switches *a* to *i*, inclusive, in consecutive order.

The color switches are indicated by CW for the white lights; CR for the red lights and CB for the blue lights and there is a color switch for each sub-group of switches on the pilot board. The switches *a* to *i*, inclusive, of each group, have like contacts connected to a common wire or scene-control conductor, these wires or scene-control conductors being designated 58′ to 69′, inclusive and respectively. These wires are connected to the respective color switch, as by wires 58ᵃ to 69ᵃ, respectively. The master switch mains 54, 55, 56, and 57, are connected to one terminal of the color switch of sub-groups, master switch main 54 is connected to the color switch of sub-group 4, of each of the major groups, as at 70, 71, and 72. Master switch main 55 is connected to the color switch of sub-group 3, of each of the major groups, as at 74, 75, and 76. Master switch main 56 is correspondingly connected as at 77, 78, and 79, and master switch main 57, as at 80, 81, and 82. In this instance, there are four separably operable master switches 54′, 55′, 56′, and 57′, one for each of the master switch mains. Each of the sub-groups of switches when closed thru the color switch and thru the master switch preferably energizes an independent relay to control a contractor, or energizes an independent coil of the contactor. Thus all and any of the switches *a* in group 50 control the white footlights. The switches in the same vertical alignment in group 51, independently control the red lights of the foots, and similar switches of group 52 control the blue lights of the foot lights. In other words, the vertical group of switches *a* control the foot lights, vertical group *b*, the proscenium lights, and so on.

The arrangements of circuits is such that there is no interference and no "sneak" circuits are established in the use of the system.

The operation of the system is substantially as follows: Assume that it is desirable to produce a "scene" in which there is required the white foot lights, red proscenium lights, and the blue lights of border number 1. Switch *a* of any of the sub-groups of group 50 is closed, say sub-group 1. Switch *b* of sub-group 1 of group 51 is closed and switch *c* of sub-group 1 of group 52 is closed and the corresponding color switches 80, 81, and 82, are closed. The set-up is now ready. When this set-up is to be brought into service the master switch 57′ is closed, which will energize the circuits of the set-up and light the lamps controlled thereby.

It will now be apparent that any other combination may be formed by closing other switches of the sub-groups 2, 3, or 4, and their color switches 70 to 79, leaving the master switches 54′, 55′, or 56′ controlling the new combination, open until the illumination is required. It will be apparent, therefore that the lights for one scene may be cut out and those for a new scene brought into use by merely opening one master switch and closing another.

Assuming that switch *d* of sub-group 1 in an active set-up is closed and it is desired to light the same lamps in the second inactive set-up, the same switch in another sub-group may be closed without in any way affecting the circuit controlled by the first switch.

A set-up, to be subsequently used, should be made by switches in like sub-groups, of the several groups controlled by a master switch which is at the time open. By this means there is no leak or sneak current, passing from one set-up to another. A set up to be subsequently used, however, may contain switches that control circuits already in use in a prior set up in which event, in the transition of one set-up to the other the lamps controlled thereby are not extinguished. Furthermore, a plurality of set-ups may be energized at one time, or any part of one set-up may be retained in circuit with a subsequently energized set-up making many desirable combinations. A set-up to "go dark" requires only that its controlling color switch be opened. The set-up is not necessarily destroyed by extinction of the lamps which it controls as it may be preserved and used again without adjusting any of the switches except the controlling color master.

The switches, including the switches *a* to *i* in each sub-group and the color and master switches, indicate clearly by the position of a part thereof or in connection therewith, customarily the switch handle, whether or not they are in closed position, and if closed, they clearly indicate the combination established by the inactive set-ups. In other words, by observing the positions of portions of the switches *a* to *i*, an operator can readily ascertain exactly which lighting circuits will be energized upon the closing of a color or master switch. The positions of the portions of the switches are as readily observable as pilot lamps, and hence pilot lamps, which heretofore were the only means used for this purpose, need not be provided.

It is manifest from the foregoing disclosure that a large number of non-interfering combinations or set-ups may be established, in the practice of the system, that may be subsequently energized and controlled by use of one or the other of the master switches and that in some examples, more than one master switch may be used to control a set-up.

I am aware that many changes may be made and numerous details of construction may be varied through a wide range without departing from the principles of this invention and I, therefore, do not purpose limiting the patent granted thereon otherwise than necessitated by the prior art.

I claim as my invention:

1. An electric current control system having in combination a plurality of current supply circuits; a plurality of electromagnetic switches, one individual to each current supply circuit and each switch having a pair of windings which separately can close a given associated switch; a plurality of pairs of manual switches, the switches of each pair controlling respectively the energization and deenergization of the two windings of a given associate electro-magnetic switch and a master switch to close circuit through like closed manual switches of all of the pairs.

2. An electric current control system having in combination a plurality of current supply circuits; a plurality of electro-magnetic switches, one individual to each current supply circuit and each switch having a pair of windings which separately can close a given associate switch; a plurality of groups of manual switches; each group comprising a plurality of pairs of sub-groups, like switches of each pair of sub-groups controlling the energization and deenergization of the electromagnetic windings, respectively, and a master switch controlling each sub-group.

3. An electric current control system having in combination a plurality of current supply circuits; a plurality of electro-magnetic switches, one individual to each current supply circuit and each switch having a plurality of windings, which separately can close a given associated switch; a plurality of groups of manual switches, like switches of the groups arranged in sub-groups, and controlling the energization and deenergization of the respective windings of a given electromagnetic switch common to a given current supply circuit; a master switch controlling each sub-group and a switch controlling like sub-groups of each group.

4. An electric current control system having in combination a plurality of current supply circuits; a plurality of electro-magnetic switches, a plurality of which control the same current supply circuit, and each switch having a plurality of windings which separately can close a given associate switch; a plurality of groups of manual switches, each group divided into a plurality of sub-groups; there being as many sub-groups in a given group as there are windings for controlling a given current supply circuit; and a master switch for each sub-group.

5. An electric current control system having in combination a plurality of groups of current supply circuits; a plurality of groups of electro-magnetic switches for controlling the respective circuits, one switch individual to each current supply circuit and each switch having a plurality of windings which separately can close a given associate switch; a plurality of groups of manual switches, the switches of each group arranged in a plurality of sub-groups and like manual switches of the sub-groups, of all of the groups, controlling circuits common to a given group of circuits by closing circuit through the respective windings and a master switch for each of the sub-groups.

6. An electric current control system having in combination a plurality of groups of current supply circuits; a plurality of groups of electro-magnetic switches for controlling the respective circuits, one switch individual to each current supply circuit and each switch having a plurality of windings which separately can close a given associated switch; a plurality of groups of manual switches, the switches of each group arranged in a plurality of sub-groups, and like manual switches of the sub-groups of all of the groups controlling circuits common to a given group of circuits by closing circuit through the respective windings; a master switch for each of the sub-groups and another master switch for each sub-group controlling, respectively the master switches of like sub-groups of each of the groups.

7. An electric current control system having in combination a plurality of current supply circuits; a plurality of electro-magnetic switches a plurality of which control the same current supply circuit; a plurality of groups of manual switches divided into sub-groups;

like switches of each sub-group of all the groups controlling the respective current supply circuit by energizing respective electromagnetic switches, and a master switch for each sub-group of manual switches.

8. In combination, a plurality of lighting circuits, a source of energy therefor, a plurality of groups of means for controlling said lighting circuits, each lighting circuit being energizable by a plurality of switch means each in a different group, said means being pre-settable into closed position, and separably operable means connected to each of said groups for selectively connecting the closed means of each of said groups to said source of energy and energizing the lighting circuits controlled by any group regardless of the combination of lighting circuits controlled by any other group.

9. In an electrical illuminating system, a source of energy, a plurality of lighting circuits, a plurality of groups of switch means for controlling said lighting circuits, each of said lighting circuits being energizable by a switch means in a plurality of said groups, each of the switch means in said groups being pre-settable in closed position for energizing certain of said lighting circuits without interference with the circuits controlled by any other of said switch means, and means for selectively connecting any of said groups of switch means to said source of energy.

10. In a theatre-lighting system, the combination with a supply circuit having a plurality of separately operable switches and a plurality of load circuits, and means including a group of presettable switches for each load circuit, each of which is associated with a different separately operable switch for selectively connecting any of said groups of source to each preselected group of lighting circuits whereby desired combinations of said lighting circuits may be preselected for a series of scenes and whereby the circuits of each selected combination may be energized independently of the circuits for preceding or subsequent scenes.

11. In a theatre-lighting system, the combination with a plurality of load circuits and a supply circuit, of means including a plurality of switches for each load circuit, each of which is associated with a different separately operable switch for selectively controlling the connection of said supply circuit to said load circuits whereby a series of desired combinations of said load circuits for successive scenes may be preselected and whereby the circuits of each of said combinations may be energized independently of the adjustment for preceding scenes.

12. In combination with a plurality of load circuits, a plurality of groups of switch means therefor, a means common to the switch means in each group for controlling the energization of that group, certain of said load circuits being connected to certain of said switch means, and a means individual to each switch means adapted to indicate whether actuation of its said control means shall cause current to flow through said switch means.

13. In combination in a theatre-lighting system, a plurality of groups of switch means, a source of electric energy, a common means for controlling the energization of the switch means of each group, a plurality of lighting circuits controlled by said switch means, a common connection from each lighting circuit to a switch means of a plurality of groups, and a means individual to each switch means adapted to indicate whether actuation of its said control means shall cause current flow through said switch means.

14. In combination in a theatre-lighting system, a plurality of groups of switch means, a source of electric energy, a common means for controlling the energization of the switch means of each group, a plurality of lighting circuits controlled by said switch means, a common connection from each lighting circuit to a switch means of a plurality of groups, and presettable means individual to each switch means whereby desired combinations of said lighting circuits may be pre-selected for a series of scenes and whereby the lighting circuits of each selected combination may be energized without disturbing the adjustment for preceding or subsequent scenes, and adapted to indicate whether actuation of its said control means shall cause current flow through said switch means.

15. In a theatre-lighting system, the combination with a plurality of load circuits and a supply circuit having a plurality of separately operable switches for controlling the supply of current to the said load circuits, of a plurality of switch means connected in common to each load circuit and individually to a different first said switch and which may pre-set the load circuits for energization in pre-selected groups whereby different preselected groups of load circuits may be energized upon the closure of different separately operable switches.

16. In a theatre-lighting system, in combination with a plurality of load circuits and a supply circuit having a plurality of separately operable switches for controlling current to the load circuits, of a plurality of switch means connected in common to each load circuit, the switch means of each load circuit being associated with a different separately operable switch and each of which may be pre-set to energize its associated load circuit independently of any other circuit when its associated separately operable switch is closed.

17. A combination comprising a plurality of load circuits, a source of energy therefor, a plurality of means pre-settable for selectively completing the circuit between said source and each load circuit, said means being sub-divided into groups, each group comprising a member individual to each load, and means individual to each group to concurrently control the circuits of that group from said source to said load independently of any circuits in any other group.

18. A combination comprising a plurality of groups of switch means, a plurality of tric energy therefor, a common means for controlling the energization of the switch means of each group, a plurality of load circuits controlled by said switch means, a common connection from each load circuit to a switch means of a plurality of groups, and a means individual to each switch means adapted to indicate whether actuation of its said control means shall cause current flow through said switch means, the control of a combination of load circuits by one group of switch means being independent of any circuits controlled by another group.

19. A combination comprising a plurality of groups of switch means, a plurality of loads to be controlled respectively by the individual switch means of a group, means for supplying current to the said switch means, means individual to each switch means of each group to indicate whether current from said source shall flow through the said switch means, and means to interrupt current flow through said switch means from said source and to prevent the interconnection of said loads through a switch group except when it is connected to said source.

20. In a theatre-lighting system, the combination with a supply circuit having a plurality of separately operable switches and a plurality of load circuits, of controlling devices for each of said circuits, and means including a group of switches for each load circuit, each of which is associated with a different separately operable switch for selectively controlling the connection of said source to said controlling devices whereby desired combinations of said lighting circuits may be preselected for a series of scenes and whereby the circuits of each selected combination may be energized without disturbing the adjustment for preceding or subsequent scenes.

21. In a theatre-lighting system, the combination with a plurality of load circuits and a supply circuit having a plurality of separately operable switches, of means including a plurality of switch means for each load circuit, each of which is assocated with a different separately operable switch for selectively controlling the connection of said supply circuit to said load circuits whereby a series of desired combinations of said load circuits for successive scenes may be preselected and whereby the circuits of each of said combinations may be energized without disturbing the adjustment for preceding scenes.

22. The method of illuminating with electric lamps energized by a plurality of separate load circuits, in a system having a plurality of separately operable control switches in commonly connected group, which consists in closing selected switches of each group for connecting them to selected load circuits and in separately energizing the common connection of each group of control switches whereby selected load circuits are energized.

23. In a theatre-lighting system, the combination with a plurality of load circuits and a plurality of switch means for each load circuit and having a common connection thereto and which may be pre-set to prepare the circuits for selective energization in predetermined group combinations, each combination consisting of any desired load circuits, of a supply circuit and a separately operable supply switch for each selected group combination which permits energization of all of the prepared circuits of the selected group when the supply switch associated therewith is closed independent of any deenergized circuit.

24. In combination with a plurality of load circuits, a control device for each load circuit, a plurality of groups of switch means therefor, a common means for controlling the energization of the switch means in each group, a common connection from each control device to a plurality of switch means in different groups, and a means individual to each switch means adapted to indicate whether actuation of its said first said means shall cause current to flow through said switch.

25. In combination in a theater lighting system, a plurality of groups of switch means, a source of electric energy therefor, means insuring common energization of the closed switch means of a group, a plurality of lighting circuits controlled by the said switch means, each group of switch means being pre-settable to predetermine a desired combination of lighting circuits for subsequent energization without interference with the combination preselected on another group, and a means individual to each switch means adapted to indicate whether actuation of its said first said means shall cause current flow through said switch means.

26. In combination in a theater lighting system, a plurality of groups of switch means, a source of electric energy therefor, means insuring common energization of the closed switch means of a group, a plurality of lighting circuits controlled by the said switch means, and a pre-settable means individual to each switch means whereby any desired combinations of said lighting circuits may be pre-selected for a series of scenes, and whereby the lighting circuits of each selected combination may be energized without disturbing the adjustment for preceding or subsequent scenes and without interference, and adapted to indicate whether actuation of its said control means shall cause current flow through said switch means.

27. A combination comprising a plurality of groups of switch means, a source of electric energy therefor, means insuring the common energization of the closed switch means of a group, a plurality of load circuits controlled by the said switch means, and electrically associated therewith to provide for the preselection of a plurality of any desired combinations of load circuits for subsequent energization in a desired order to provide predetermined lighting effects, and a means individual to each switch means adapted to indicate whether actuation of its said first said means shall cause current flow through said switch means.

28. In a theater lighting system, a plurality of lighting circuits, a current supply line, a plurality of separately operable means arranged in groups for electrically controlling said lighting circuits, a common connection for the means in each group, said means being pre-settable in position to govern the energization of selected lighting circuits to preselect desired combinations of lighting circuits for subsequent energization, each selected combination of lighting circuits being independent when energized of any deenergized circuits, and energization means for selectively electrically connecting in a desired order the common connections of the groups to the supply line to successively energize different predetermined combinations of lighting circuits.

29. In a theater lighting system, a plurality of lighting circuits, current supply means, a plurality of separately operable means each capable of electrically controlling one of said lighting circuits, said means being each pre-settable in position to govern the energization of a lighting circuit, and a plurality of energizing means each disposed to in every instance selectively energize from said current supply means only a predetermined combination of said separately operable means and cause the energization of the corresponding lighting circuits to produce a desired lighting effect.

30. In a theater lighting system, a plurality of lighting circuits, a current supply line, a plurality of separately operable means for electrically controlling sad lighting circuits, said means each being pre-settable in position to electrically connect it with a lighting circuit, whereby selected means may be preset to determine any desired preselected combinations of lighting circuits to provide different lighting effects, and a plurality of energizing means each disposed to selectively energize from said supply line a plurality of said separately operable means to cause in every instance energization of only a preselected combination of lighting circuits, the hook-up being such that said energizing means may be operated individually or contemporaneously as desired to produce any predetermined lighting effect.

31. The method of illuminating with electric lamps arranged in a plurality of load circuits, in a system having a plurality of separately operable means in commonly connected groups for electrically controlling the load circuits, consisting of selecting any desired combinations of said load circuits by pre-setting the proper means of each group, and then energizing the common connections of as many groups as is necessary to provide the desired combination of load circuits, and then energizing the common connections for a different combination and deenergizing those of the first combination not now desired, without disturbing the initial setups of the means of each group.

32. The method of illuminating with electric lamps arranged in a plurality of separate load circuits, in a system having a plurality of separately operable control switches in commonly connected groups, which consists in pre-selecting any desired combination of said load circuits on each group of control switches by closing certain of the switches of each group, and then energizing and deenergizing desired common connections of the groups, and subsequently energizing and deenergizing said common connections in a desired order without disturbing the setting of said control switches.

33. The method of illuminating with electric lamps arranged in a plurality of load circuits, in a system having a plurality of means in commonly connected groups for electrically controlling said load circuits, consisting of preselecting any desired load circuits by presetting certain of said means in each group in circuit making position, forming several circuits each including as many of the common group connections as necessary to provide the desired combinations of load circuits, and separately energizing said last said circuits whereby preselected lighting load combinations are energized.

34. The method of illuminating with electric lamps arranged in a plurality of lighting circuits, in a system having a plurality of separately operable means for electrically controlling the lighting circuits, consisting of presetting selected ones of said means in position to electrically control selected lighting circuits and commonly connecting them in different group combinations, each commonly connected combination controlling a predetermined lighting effect made up of any desired lighting circuits, and energizing the common connections in a desired order to produce successively predetermined lighting effects.

35. The method of illuminating with electric lamps arranged in a plurality of lighting circuits, in a system having a plurality of separately operable means for electrically controlling said lighting circuits, consisting of presetting selected ones of said means in position to electrically control selected lighting circuits, and energizing and deenergizing in any desired order different combinations of preset means to successively produce any desired predetermined lighting effects.

36. The method of illuminating a theater with electric lamps arranged in a plurality of load circuits, in a system including a plurality of separately operable means for electrically controlling the load circuits, consisting of preselecting different combinations of load circuits for subsequent energization by presetting certain of the means in a plurality of said groups in circuit closing position, and then energizing the common connections of the groups in any desired order to provide the desired combinations of load circuits in keeping with the scenes of a production.

37. The method of illuminating a theater with electric lamps fitted to provide different colors and arranged in a plurality of separate load circuits, in a system including a plurality of separately operable means for electrically controlling the load circuits arranged in commonly connected groups and a plurality of master control means, consisting of preselecting a combination of load circuits for a scene by presetting certain of the separately operable means in different groups in position to close the circuits through corresponding load circuits in a desired color, and commonly connecting the common connections of the groups having preset means to a master control, similarly setting up circuits for other scenes and commonly connecting the circuit combinations for each scene to a different master control, and energizing and deenergizing the circuits through said master controls in any desired order.

38. The method of illuminating a theater with electric lamps arranged in a plurality of separate load circuits, in a system including a plurality of separately operable means for electrically controlling the load circuits arranged in commonly connected groups, consisting of presetting selected means of a plurality of groups in circuit making position to preselect desired combinations of load circuits, commonly connecting a desired number of the common group connections to preselect all load circuits for a scene, similarly setting up load circuits for other scenes, and energizing the circuits for each scene in any desired order consistent with the production.

39. The method of illuminating with electric lamps arranged in a plurality of load circuits, in a system having a plurality of separately operable means for electrically controlling the load circuits arranged in commonly connected groups, consisting of presetting selected means of a plurality of the groups in position for governing the energization of selected load circuits, energizing the common connections of said plurality of groups in any desired order to energize selected combinations of load circuits, and individually operating any desired one of said means having an energized group connection to individually electrically control the corresponding load circuit.

40. The method of illuminating with electric lamps arranged in a plurality of load circuits, in a system having a plurality of separately operable means in commonly connected groups for electrically controlling the load circuits, consisting of presetting selected means of a plurality but not all of the groups for governing the energization of selected load circuits to preselect desired lighting effects, energizing the common connections of said plurality of groups in any desired order whereby selected lighting effects may be successively produced, energizing the common group connections of those groups in which no means were preset, and individually operating selected means on the last said common connections to vary said preselected lighting effects at will.

41. The method of illuminating with electric lamps arranged in a plurality of load circuits, in a system having a plurality of separately operable means arranged in commonly connected groups for electrically controlling the load circuits, consisting of presetting selected means of a plurality of groups in position for governing the energization of selected load circuits, and energizing the common connections of the groups separately or in multiples as desired whereby selected combinations of load circuits may be successively energized.

42. In a theater lighting system, a plurality of lighting circuits arranged in various colors, current supply means, a plurality of separately operable means for electrically controlling said lighting circuits, said means being presettable in position to control the energization of the lighting circuits, separately operable means for commonly connecting preset ones of said first means in groups, each group including controls for lighting circuits in desired colors, and energizing means operable to energize the commonly connected groups of means in any desired order and independently of any circuits on the deenergized groups.

43. In a theater lighting system, a plurality of lighting circuits, current supply means, a plurality of means presettable in advance in position to govern the subsequent energization of lighting circuits, and a plurality of energizing means disposed to selectively energize from said current supply means any predetermined combination of the second said means and cause the energization of corresponding lighting circuits to produce a predetermined lighting effect and to enable a plurality of desired predetermined lighting effects to be successively produced from said circuits.

In testimony whereof I have hereunto subscribed my name at Chicago, county of Cook, State of Illinois, this 22nd day of June, 1928.

ALBERT R. LOCKE.

CERTIFICATE OF CORRECTION.

Reissue No. 18,593. September 13, 1932.

ALBERT R. LOCKE.

It is hereby certified that error appears in the printed specification of the above numbered patent requiring correction as follows: Page 2, line 25, for "light" read "lighting; and line 40, for "name" read "same""; page 3, line 11, for the words "of the respective sub-groups, in" read "c controls border lights No. 1; the"; line 65, for "contractor" read "contactor"; and line 115, strike out the comma after "current"; page 5, line 40, claim 10, for the words "connecting any of said groups of" read "controlling the connection of said"; page 6, lines 11 and 12, claim 18, for "plurality of tric" read "source of electric"; and line 72, claim 22, for "group" read "groups"; page 7, line 59, claim 30, for "sad" read "said"; page 8, line 41, claim 37, strike out the article "a", and line 42, for "color" read "colors; and line 129, claim 42, strike out the article "the"; and that the said Letters Patent should be read with these corrections therein that the same may conform to the record of the case in the Patent Office.

Signed and sealed this 29th day of November, A. D. 1932.

M. J. Moore,
Acting Commissioner of Patents.

(Seal)